(12) United States Patent
Lubbers et al.

(10) Patent No.: US 6,996,672 B2
(45) Date of Patent: Feb. 7, 2006

(54) SYSTEM AND METHOD FOR ACTIVE-ACTIVE DATA REPLICATION

(75) Inventors: Clark Lubbers, Colorado Springs, CO (US); Susan Elkington, Colorado Springs, CO (US); Randy Hess, Colorado Springs, CO (US); Stephen J. Sicola, Palmer Lake, CO (US); James McCarty, Colorado Springs, CO (US); Anuja Korgaonkar, Colorado Springs, CO (US); Jason Leveille, Colorado Springs, CO (US)

(73) Assignee: Hewlett-Packard Development, L.P., Houston, TX (US)

( * ) Notice: Subject to any disclaimer, the term of this patent is extended or adjusted under 35 U.S.C. 154(b) by 647 days.

(21) Appl. No.: 10/106,865

(22) Filed: Mar. 26, 2002

(65) Prior Publication Data

US 2003/0188218 A1   Oct. 2, 2003

(51) Int. Cl.
*G06F 12/00* (2006.01)
*G06F 12/14* (2006.01)
*G06F 12/16* (2006.01)
*G06F 13/00* (2006.01)
*G06F 13/28* (2006.01)

(52) U.S. Cl. .................. 711/114; 709/208; 709/210
(58) Field of Classification Search ............... 711/112, 711/114
See application file for complete search history.

(56) References Cited

U.S. PATENT DOCUMENTS

| | | | |
|---|---|---|---|
| 5,533,190 A | | 7/1996 | Binford et al. |
| 5,659,704 A | * | 8/1997 | Burkes et al. ............... 711/114 |
| 5,721,918 A | | 2/1998 | Nilsson et al. |
| 5,893,155 A | | 4/1999 | Cheriton |
| 6,041,423 A | | 3/2000 | Tsukerman |
| 6,148,368 A | | 11/2000 | DeKoning |
| 6,185,663 B1 | | 2/2001 | Burke |
| 6,219,753 B1 | * | 4/2001 | Richardson ................. 711/114 |
| 6,275,783 B1 | | 8/2001 | Okamura |
| 6,643,795 B1 | * | 11/2003 | Sicola et al. .................... 714/6 |

OTHER PUBLICATIONS

Elkington, Susan, Enterprise Project, Data Replication Manager Functional Specification for VCS V3 Release, Compaq Computer Corporation, Nov. 30, 3001, pp. 1-68.
Hess, Randy and Korgaonkar, Anuja, Enterprise Project, DRM Logging, Compaq Computer Corporation, Nov. 25, 2001, pp. 1-12.
Hoffman, Brian, Enterprise Software Functional Specification V0.10, Compaq Computer Corporation, Jul. 25, 2001, pp. 1-26.

(Continued)

*Primary Examiner*—Donald Sparks

(57) ABSTRACT

A system and method for replicating data between a plurality of storage locations. Each storage location has a controller with a port to a data communication network and a pool of storage. A logical unit (LUN) of storage is implemented at each storage location such that each implemented LUN comprises a substantially complete replica of the data stored in each other LUN. At least two of the controllers at the plurality of storage locations present their implemented LUN as an active device to the one or more host systems for receiving operational data access requests. Preferably, there are three or more storage locations in the system. Preferably, there are three or more storage locations in the system and each storage location can behave as a source location or a destination location for a particular operational data transaction.

21 Claims, 7 Drawing Sheets

OTHER PUBLICATIONS

Multi-Directional Architectural Design, pp. 1-3.

Features and Benefits of HSG80 ACS 8.6P Data Replication Manager, COMPAQ White Paper, Oct. 2001, Enterprise Storage Group, Compaq Computer Corporation, pp. 1-15.

Storage Virtualization and the StorageWorks Enterprise Virtual Array, COMPAQ White Paper, Sep. 2001, Enterprise Storage Array Division Marketing, Compaq Computer Corporation, pp. 1-13.

SCSI-2 Spec—Logical characteristics, http://www.uni-mainz.del~koenig/scsi/SCSI2-06.html, Mar. 8, 2002, pp. 3-31.

Understanding Replication in Databases and Distributed Systems, Jul. 13, 1997, Computer Based Learning Unit, University of Leeds, pp. 1-26.

ENSA-2 VersaStor Virtualization Technology, Enterprise Storage Group, Storage Works by COMPAQ White Paper, Dec. 2001, Compaq Computer Corporation, pp. 1-10.

NCITS T10, Project 1144D, Revision 07a, Nov. 1, 2001, pp. 8-26.

StorageWorks by Compaq Enterprise Virtual Array, QuickSpecs, World Wide- version 5, Feb. 27, 2002, pp. 1-12.

T10/98-203 revision 0, Persistent Reservations, Jul. 7, 1998, pp. 1-20.

ISCSI: ISID and the New Persistent Reservations Proposals, http://www.pdl.cmu.edu/mailinglists/ips/mail/msg07055.html, Mar. 19, 2002, pp. 1-4.

Software Product Description, Compaq SANworks Virtual Replicator-Version 2.0, SPD: 70.41.02, Jun. 5, 2000, pp. 1-5, Compaq Computer Corporation.

Features and Benefits of HSG80 ACS 8.6P Data Replication Manager, Oct. 2001, pp. 1-22, Compaq White Paper, Enterprise Storage Group, Compaq Computer Corporation.

Information Systems—dpANS Fibre Channel Protocol for SCSI, revision 012, Dec. 4, 1995, pp. i-63, American National Standard-draft.

Information Technology—Fibre Channel Protocol for SCSI, second version (FCP-2), Nov. 1, 2001, pp. ii-133, American National Standard-draft.

\* cited by examiner

SYSTEM AND METHOD FOR ACTIVE-ACTIVE DATA REPLICATION

FIELD OF THE INVENTION

The present invention relates generally to data replication in distributed data storage systems, and more specifically, to a system and method for implementing multi-directional copy sets where each member of the set can be active with respect to data access operations.

BACKGROUND OF THE INVENTION AND PROBLEM

Data replication involves a variety of techniques and mechanisms that operate to copy or replicate data between locations in a distributed computing system. By creating multiple copies of data, the data remains available in the event of a disaster at one of the locations. This is typically referred to as "fault tolerance" and is very important to databases. Moreover, in systems where each copy of the data can support data access operations such as read, write, or both, data can be accessed more quickly and by more users at the same time, thereby improving performance. The improved performance is useful in a variety of information technology applications such as file serving, application serving, and the like.

Data replication management generally involves systems and methods for creating storage devices to contain data, organizing the storage devices into replication groups, and determining when and how data will be copied between the devices. This includes replication protocols, mechanisms for ensuring timely synchronization, failover, data access request redirection, and the like. In many systems, data replication management may be performed by a storage controller that offloads the operations related to processing data access operations and data replication operations from host processors that use the data.

From the perspective of a host computer using stored data, it is desirable that the replication mechanism be as invisible as possible. To this end, storage controllers present a single logical unit (LUN) of storage even though the storage is physically implemented in more than one location. The host will conduct operational data transfers by addressing a read or write operation to the desired LUN, and the controller implements processes that execute the read or write operation appropriately. A DRM system typically designates one controller as "active" meaning that it handles the read/write request in the first instance, and a second controller as "passive" in that it acts as a backup to the active controller, but otherwise does not participate in operational data transactions. This "active-passive" architecture simplifies implementation and implies an order for executing every operation so that data at the active and passive locations remain consistent. Upon failure of an active controller, the passive controller is placed in the active role, and handles subsequent access request in the first instance until a second controller can be brought online and data replication completed.

Compaq Corporation introduced a data replication management product called the HSG80, described in U.S. patent application Ser. Nos. 09/539,745 and 09/538,680 assigned to the assignee of the present application and incorporated herein by reference, that implemented an architecture with redundant storage controllers. While effective, each of the controllers could only interact with a single other controller. With respect to a given data set, each controller was either in a role of being primary, or a secondary, and switching from a secondary role to a primary role was a non-trivial event that took place at failover. Controllers were set up as primary or secondary when initially configured, and changing that configuration at failover involved several manual tasks at the controller and at the host level. This switchover typically required rebooting the host, and sometimes rebooting the secondary controller to change its role, a disruptive process. Because of this rigid role assignment, a primary controller could not operate with multiple secondary controllers, and a secondary controller could not, in turn, act as a primary controller with respect to other controllers.

The rigid role assignment made it difficult to have two controllers that were active with respect to a given copy set. While the Ser. No. 09/538,680 application describes a configuration that is nominally active-active, only one controller was active with respect to a given host for a copy set at any instant in time, hence only one controller would process that host's write requests. This is useful in that a given storage controller could be active for a first host and another storage controller active for a second host, thereby efficiently using the storage controllers' resources.

However in this system, a given host could not see more than one active controller for a given data set. Each data set included one or more LUNs, some of which were primary LUNs and others of which were secondary LUNs from the perspective of each controller. Each LUN had a unique identification called a world wide LUN identifier (WWLID) and controllers were configured such that one WWLID would identify the initiator (primary) LUN, and another WWLID would identify the target (secondary) LUN. The controller only presented the WWLID of the initiator LUN to the host. Hence, a given host was unaware, until failover, that the target LUN existed. At failover, the controllers would be altered such that the source and destination LUN WWIDs were the same (i.e., taking on the value of the non-failing LUN).

While this architecture allowed both controllers to handle operational data access requests from hosts, it retains a paradigm in which for a given data transaction from a host, a single specified LUN was in a rigid role of a initiator and another specific LUN was in a rigid role of the target. A host could not see all of the LUNs involved in a particular copy set, only the single LUN designated as an initiator for that host. A host had to direct a request to the initiator LUN until a failure condition occurred. In practice, the architecture did not allow scaling to copy sets at more than two locations. Extending a bi-directional system to perform multi-directional replication increases complexity significantly. Hence, the protocols for data replication operations are not directly applicable to a system where more than one replica exits in a copy set.

A particular operation that has been difficult to manage in conventional systems involves reservations, such as SCSI reservations, that manage exclusive access to a LUN or a portion of a LUN. Reservations are used to enable multiple hosts to share access to a LUN while maintaining integrity of the data in the event that two hosts attempt to write to the same block of data substantially simultaneously. SCSI provides two methods for managing reservations. A conventional reservation is managed by an initiator device that places a reservation or lock on other LUNs, then releases that reservation when it is no longer needed. A persistent reservation effects similar data protection, but is intended to survive failure of the initiator device. Hence, in a persistent reservation the reservation must be maintained in a persistent database that can be accessed in the event of a device failure.

The SCSI reservation mechanism was designed for storage systems with multiple hosts accessing a single shared storage resource, hence, persistent reservations could be implemented by appropriate communication between hosts that shared the LUN, or by a data structure storing a persistent reservation database that was independent of a controller. However, in a data replication system a significantly different environment exists, namely, there are multiple LUNs and multiple hosts. Conventional systems would allow only one LUN to be active in a copy set at any time, therefore solving the reservation issue by ensuring that reservations would be handled by a particular controller until failover. However, this solution does not extend to an environment where any LUN in a copy set may be active, and therefore a reservation received by any LUN must be propagated to all replicas to ensure exclusive access performance expected by the hosts. It is desirable to relieve the hosts of responsibility for ensuring that reservations are performed against all replicated LUNs. Moreover, it is desirable that the storage system handle persistent reservations between the various replicas such that if one controller fails or becomes unavailable, the reservation is properly implemented.

Therefore, there remains a need in the art for a data storage system capable of providing data replication services to multiple members of a copy set, particularly more than two members. A need also exists for providing multidirectional copy sets in a manner that allows more than one controller to be active for read and/or write operations, and that allows presentation of multiple active LUNs in a copy set to each host.

SUMMARY OF THE INVENTION

Briefly stated, the present invention involves a system and method for replicating data between a plurality of storage locations. Each storage location has a controller with a port to a data communication network and a pool of storage. A logical unit (LUN) of storage is implemented at each storage location such that each implemented LUN comprises a substantially complete replica of the data stored in each other LUN. At least two of the controllers at the plurality of storage locations present their implemented LUN as an active device to the one or more host systems for receiving operational data access requests. In another aspect, the present invention includes mechanisms for implementing persistent reservations to enable write operations to be protected in the event of device failures in an environment with multiple active devices. In particular implementations, there are three or more storage locations in the system and each storage location can behave as a source location or a destination location for a particular operational data transaction.

DETAILED DESCRIPTION OF THE PREFERRED EMBODIMENTS

Figure 1:
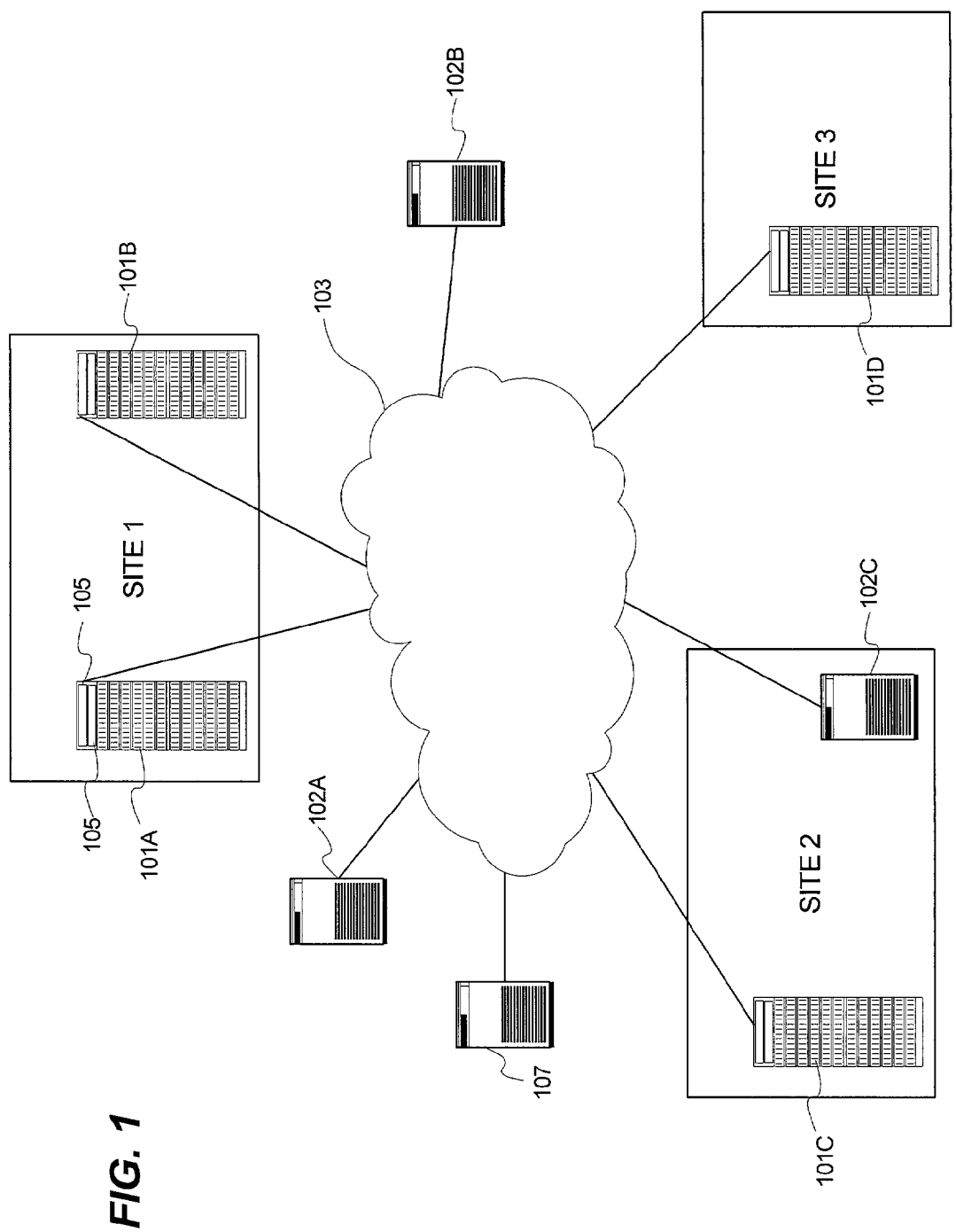
FIG. 1 shows a networked computer environment in which the present invention is implemented.

In general, the present invention involves multi-directional copy sets that implement replicated data storage in more than two locations, preferably in an "active-active" manner where "source" and "destination" roles are flexibly assigned to the locations. A copy set comprises a bound set of virtual disks or LUNs, where each virtual of the set stores a replica of the copy set data. The virtual disks in a copy set are presented to hosts as a single LUN even though the virtual disks are distributed geographically and/or topologically on a storage area network (SAN) to provide disaster tolerance and/or improved performance. By "active-active" it is meant that each site can be enabled to handle read, write, and copy operations to the LUN in a manner that propagates the operations to each other virtual disk in the copy set. The present invention is also directed to systems, methods and software that enable multi-directional data replication, also called "fan-out", in which data is replicated at multiple sites (e.g., more than two), where each site can be active for the LUN at the same time.

The present invention involves multiple hosts that use a host clustered file system to access the storage system in accordance with the present invention. A host clustered file system allows multiple hosts to coordinate their access to shared storage resources by providing a distributed lock manager that manages exclusive access, when necessary, by one host at a time to a given block of storage. Host clustered file systems enable communication and shared data between the participating hosts to ensure that hosts do not attempt to write data to the same block at the same time. It is contemplated that many features of the present invention can be implemented on hosts that do not implement a host clustered file system, however, such an implementation would require certain modifications to the specific embodiments described herein to implement, among other things, a substitute for the distributed lock manager, for example.

In the particular implementations, storage controllers 102 create, manage and remove LUNs, which are alternatively referred to as virtual disks. Although the terms LUN and virtual disk are used interchangeably, it may be useful to apply more precise definitions. A LUN is essentially a logical block storage device from the perspective of a host 102, whereas a virtual disk is more precisely a logical block storage device from the perspective of a controller 105 within the SAN. In other words, a controller 105 presents a virtual disk as a LUN to one or more hosts. In many storage systems this distinction is blurred because each LUN has a one-to-one relationship with a specific virtual disk. However, the present invention implements replication by providing virtual disks at several sites, each of which is a separate instance of a particular LUN from the perspective of hosts 102. Nevertheless, to encourage consistency with nomenclature in the industry, the term LUN is used herein to refer to a logical block storage device generally, and a "presented LUN" refers to a logical block storage device comprising one or more virtual disks or LUNs from the perspective of a host 102.

The storage controllers together with a pool of physical storage coupled to the controller are referred to as a "storage cell" 101. The storage controller 105 also implements fabric connections that are used to communicate operational data traffic (i.e., read and write requests from hosts), data replication data traffic (i.e., write and copy operations between controllers) and data replication management traffic (i.e., status and copy operations between controllers). The storage controller at each location presents the LUNs at that location to hosts 102 through the SAN. Each controller 105 presents only LUNs that it manages.

Virtual disks in a copy set may be designated as active (i.e., configured to handle host operational data requests), read only (i.e., configured to handle only host read requests), or passive (i.e., not accessible by a host, but accessible by other controllers). Unlike prior systems, all of the active virtual disks in a copy set may be presented to hosts as a single LUN. The host views these as alternative targets for a given data transaction. Unlike prior systems, the host may use "hints" from the storage controllers to identify which of the alternative virtual disks is a preferred target for a given data transaction, however, the hosts remain able to conduct an operational data transaction with any active virtual disk in a copy set. The virtual disk that is selected by the host is then a "source" for the data transaction, and initiates data replication processes to copy the data transaction to all other alternative or destination virtual disks in the copy set.

The present invention is described with various levels of specificity to ease description and understanding. However, unless specified otherwise, the specific implementations are examples only, and not limitations of the invention. For example, network connectivity is illustrated by fibre channel mechanisms, however, other network mechanisms provide suitable functionality in particular environments. In particular implementations storage capacity is presented as SCSI (small computer system interface) logical units, although the particular protocol is readily varied to meet the needs of a particular application. While the present invention is preferably implemented in a highly redundant architecture using redundant controllers at each location, redundant communication links between controllers and hosts, redundant ports on each controller and host, and the like, these redundancy features are largely independent of the active-active data replication management system and method to which the present application is directed. Hence, the examples given herein may be simplified by removing redundant components so as to improve understanding of the inventive features.

FIG. 1 illustrates a multi-site storage area network (SAN) implementing features in accordance with present invention. The example shown in FIG. 1 includes only three sites (Site 1, Site 2 and Site 3) for to ease illustration and understanding, however, it should be understood that any number of sites may be provided to meet the needs of a particular application. The various sites may be physically proximate, or separated by an arbitrary physical or topological separation. Physical distance refers to a physical separation such as between buildings, cities, or other geographical regions. Topological separation refers to separation between two network nodes with respect to the communication network that may or may not correspond to physical distance. Topological separation between two nodes typically increases as more devices such as switches, routers, and network connections are added between the two nodes, and may be considered to be greater for nodes coupled by slower communication links. A particular implementation may well limit the number of possible sites, and may well limit the maximum or minimum physical or topological separation of sites. Each site includes one or more storage cells 101, such as cells 101A, 101B, 101C and 101D. Any number of storage cells 101 may be included in any site, although the number implemented in any particular application may be constrained to meet the needs of that application.

The storage implemented at various sites is accessed by host computer 102, such as host computers 102A, 102B and 102C. Host computers are generally machines that consume or require data storage. Typical host computers 102 demand large quantities of storage such as mainframes, web servers, transaction processors, and the like. However, a host computer 102 may comprise a computer of any processing capacity that requires or benefits from network storage either to reduce cost of the host 102, implement more storage capacity than practical in a host 102, share data amongst multiple hosts 102, or the like. A host computer 102 may couple to the storage cells 101 via a connection to network 103 such as illustrated by host computers 102A and 102B. In many cases, a host computer 102 will be located in a site such as host computer 102C located in site 2. The topological location of host computers 102 is a matter of design choice selected to meet the needs of the particular application. In many cases, one or more host computers 102 will be located at a site. It should be appreciated, however, that host computers 102 have little to do with the management and configuration of the DRM system of the present invention, other than the reality that as consumers of data, the DRM system is preferably able to satisfy storage needs of host computers 102 at various physical and topological locations.

Storage cells 101 and hosts 102 couple to data communication network 103. Storage cells 101 implement a quantity of data storage capacity that is accessible through storage controllers 105 that implement one or more connections to network 101. Storage cells 101 typically implement hundreds of gigabytes to terabytes of physical storage capacity. Preferably, controllers 105 virtualize the physical storage capacity such that it is configurable into logical units (LUNs) of storage capacity. The LUNs implement an arbitrary quantity of logical address block storage, where each LUN has a specified level of data protection such as RAID 0–5 data protection. Hosts 102 access physical storage capacity by addressing read and write operations to specified LUNs, and can be otherwise unaware of the physical storage architecture or data protection strategy for a particular LUN that is being accessed. Storage controllers 105 manage the tasks of allocating physical storage capacity to specified LUNs, monitoring and maintaining integrity of the LUNs, moving data between physical storage devices, and other functions that maintain integrity and availability of the data stored therein.

Network 103 comprises any of a variety of available networks, and may comprise a plurality of interconnected networks. In particular examples, network 103 comprises at least two independent fibre channel fabrics to provide redundancy. These fibre channel fabrics may comprise long-distance connection mechanism 201 (shown in FIG. 2) such as asynchronous transfer mode (ATM) and Internet protocol (IP) connections that enable sites to be separated by arbitrary distances.

At least one SAN management appliance (SMA) 107 is coupled to network 103 to enable connections to storage cells 101. In practice, a number of SMAs 107 are provided, and typically an SMA 107 is located at each site to provide management operation for the storage cells 101 at that site. However, because each SMA 107 communicates through network 103, the physical and topological location of SMAs 107 is very flexible. SMAs 107 are preferably implemented at topological locations that provide redundant connections to the storage cells 101.

Figure 2:
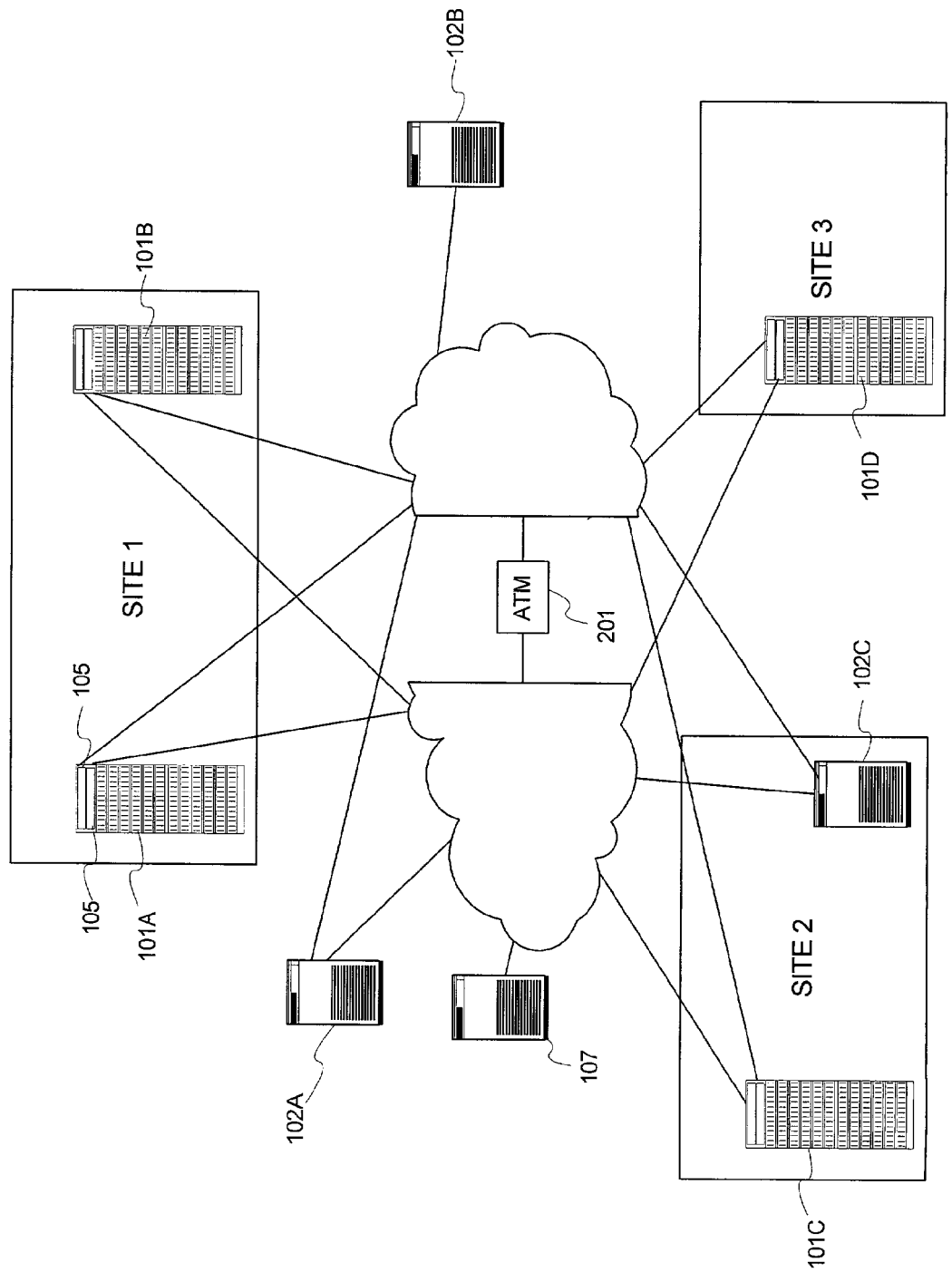
FIG. 2 illustrates an alternative networked computer environment embodying the present invention.

Network 103 is accessible directly or indirectly to all components at Site 1, Site 2, and Site 3 including hosts 102 and controllers 105. In preferred implementations, each component has redundant links to network 103, and network 103 is preferably implemented as having redundant sub-networks as shown in FIG. 2. Redundancy provides connectivity in event of failure or degradation of some portions of network 103. Redundancy also enables connectivity in event of failure or degradation of controllers 105 and/or interface components of hosts 102.

Data replication essentially involves processes and mechanisms that ensure a LUN implemented by, for example, storage cell 101A is replicated by a LUN implemented in another storage cell such as storage cell 101B, 101C, and/or 101D. In prior data replication systems, only one replicate was practically enabled, hence only two LUNs in two storage cells would be involved in the system. One LUN/storage cell would be designated the initiator and another LUN/storage cell would be designated the target. In most systems all host data traffic would be directed to the designated initiator. Assuming, for example, that the initiator LUN was in storage cell 101A, all hosts that accessed that LUN would make data requests to the controller 105 in storage cell 101A. That storage controller would then access the data from the LUN in storage cell 101A, then manage the replication to the designated target LUN. Hosts such as host 102C that were topologically remote from the initiator LUN/storage cell would expect somewhat lessened performance and/or availability than hosts that were local.

A major improvement in the prior art, described in U.S. patent application Ser. No. 09/538,680, enabled both storage controllers to act as initiators for different hosts. Hence, host 102C could use storage cell 101C as an initiator, and host 102A could use storage cell 101A as an initiator. While this division of responsibility was simpler to implement and mitigated the performance differences seen by various hosts, it did not scale well beyond two locations. Moreover, to alter the configuration the storage controllers required significant manual intervention and in some cases required rebooting the controller and/or host processes.

In the systems of FIG. 1 and FIG. 2, in accordance with the present invention it is important to realize that each storage cell 101 is able to function as a primary storage location for any of hosts 102, and at the same time function as a secondary or alternative storage location for a replica of data from another storage cell 101. This feature is referred to as "bi-directionality". In addition to this bi-directionality feature, each storage cell 101 is able to serve in a role of being a source as well as a destination, without rebooting. The source location refers to the storage cell/LUN that handles a data access request from a host 102, whereas a destination or alternative location refers to the storage cell/LUN that handles a replication operation from a source storage cell/LUN. Hence, for a given data transaction each host 102 is able to select any of the storage cells 101 having active LUNs to be the source location for that transaction, with the other storage cells/LUNs in the copy set becoming destinations for that transaction.

Unlike prior DRM systems where sites were rigidly configured as either primary or secondary sites, the present invention provides for flexible assignment at a much finer level of granularity, preferably such that individual virtual disks can be designated as either primary or alternate. One effect of such flexibility is that it becomes practical to implement enormous quantities of storage in each storage cell 101 as the capacity at each site can be readily applied to various applications with disparate storage needs. While it is possible to operate the present invention such that source/destination roles are determined on a transaction-by-transaction basis, it is more practical to identify a storage cell/LUN in the copy set that will serve as a source for a number of transactions, and is preferably a source that is physically and/or topologically local to the host that initiates the data transaction. This source/destination role designation can be altered at any time for any reason, however, a behavior that was not contemplated by any prior data replication management system. Prior systems would alter roles only in event of failure. However, the present invention can alter the roles to improve load balancing, in response to network loading, to improve quality of service, in response to the type of data being accessed (e.g., streaming video vs. database query), or other criteria specific to a particular application. In particular, with long distances and significant latency between sites, load balancing is beneficial in that it enables hosts to make faster local data access.

Figure 3A:
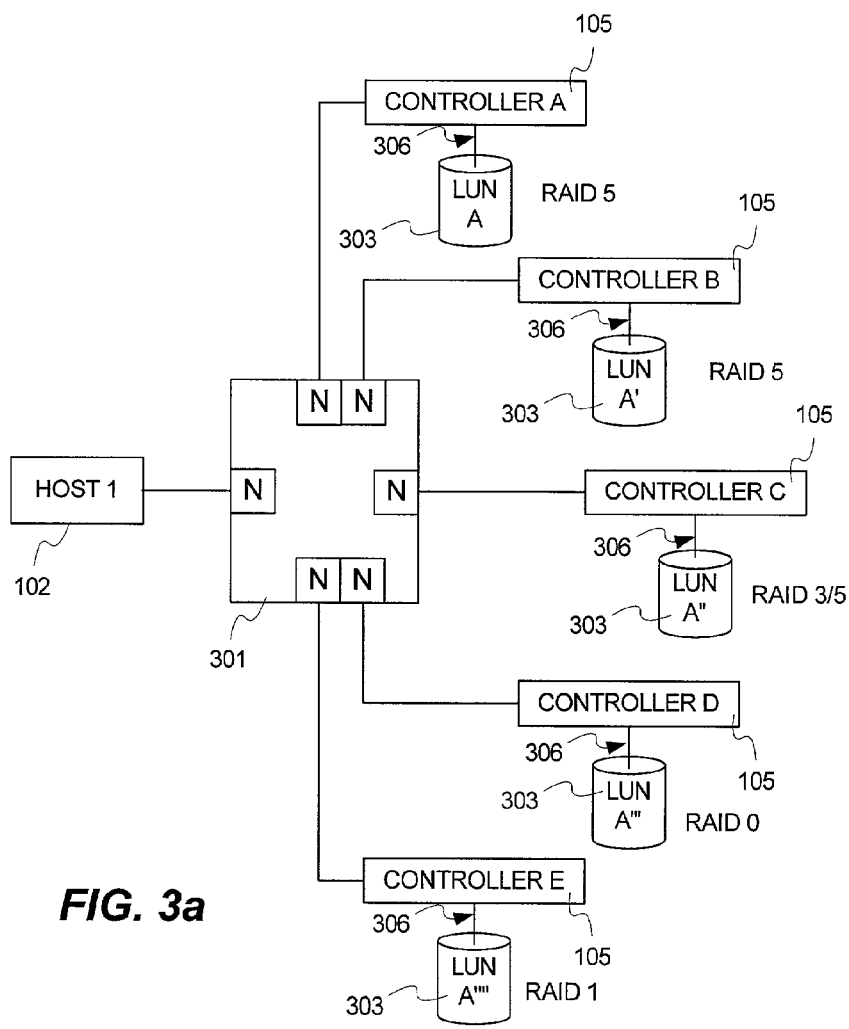
FIGS. 3a and 3b shows physical and logical implementations of a copy set in accordance with the present invention.
Figure 3B:
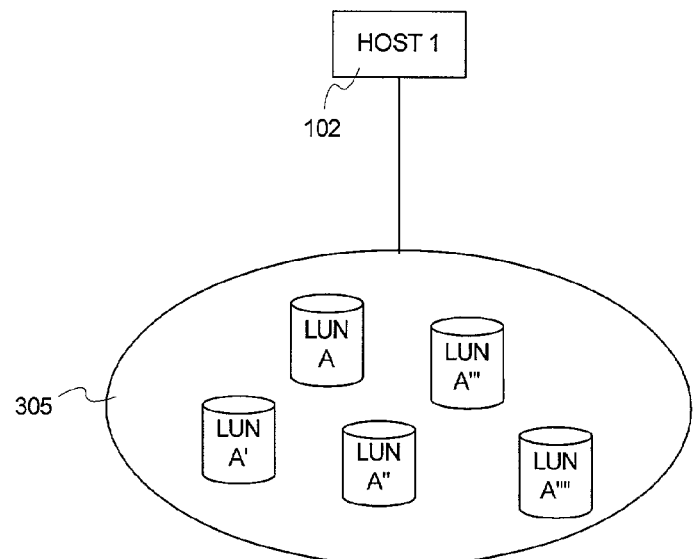

FIG. 3a illustrates a physical view of a copy set from the perspective of host 102. By comparison, FIG. 3b illustrates a logical view of the same copy set from the perspective of the host 102. Referring to FIG. 3a, host 102 couples to an N-Port of a fibre channel switch 301. Fibre channel switch 301 is a particular implementation of a communication network/fabric 103 shown in FIG. 1 and FIG. 2. Other N-Ports of switch 301 couple to various controllers 105 such as Controller A, Controller B, Controller C, Controller D, and Controller E. Again, in a practical implementation it is preferred that each LUN be accessible through redundant controllers, however, this detail is omitted from FIG. 3a to ease understanding.

In FIG. 3a, host 102 connects to switch 301 and at least one I/O port of host 102 negotiates connection properties with switch 301 in accordance with fibre channel standards. This negotiation registers a unique identification of the port of host 102 and reveals, among other things addresses for the various controllers 105 that have already registered with switch 301. Similarly, each port of controller 105 that connects to switch 301 executes a protocol that registers the identity of that controller 105 and discovers other controllers 105 and hosts 102 coupled to switch 301. Fibre channel standard protocols are used for the initial negotiation and port registration tasks in a particular embodiment.

In addition to the fibre channel standard protocols, the present invention preferably uses a new protocol that is specific to the system of the present invention to identify controllers 105 and hosts 102 that support the advanced DRM features of the present invention. This protocol is readily executed by link level services (e.g., implemented in the FC-3 or FC-4 layers defined in the fibre channel standards) that enable application-specific and manufacturer-specific protocols. This additional identification can be performed by defining a command/response exchange executed between controllers, and between controllers and hosts, that exchanges information about the capabilities, software and hardware software versions of the devices that is not available from the standard fibre channel protocol port login sequences. Preferably, this discovery protocol enables a controller 105 to identify controllers even when they do not support all of the features of the present invention, although only controllers 105 that do support these features are useful for implementing the present invention. Knowledge of other controllers is useful for other storage tasks.

Physical storage devices used to implement LUNs 303 are coupled to controllers 105 by a high-speed redundant connection such as fibre channel arbitrated loop (FCAL) connections 306 in FIG. 3. An FCAL connection allows each of tens or hundreds of individual hard disk drives to be accessed not only at high speed, but also by either controller 105 in a storage cell. Further, by providing redundant FCALs, one FCAL can fail while each storage device remains accessible by either controller.

The present invention implements a protocol for querying any controller 105 to obtain a hint indicating which controller 105 should be preferred for this particular host. Each controller 105 presents a LUN 303 (labeled LUN A, LUN A', LUN A", LUN A'" and LUN A"" in FIG. 3a and FIG. 3b) that is a member of a particular copy set. It should be understood that controllers 105 manage all of the LUNs in a storage cell 101, which maybe hundreds or thousands of LUNs. Hence, controllers 105 will likely present many other LUNs (not shown) that are not members of the copy set and so are not shown, including LUNs that are not replicated and so are not members of any copy set. Each controller manages the presentation of LUNs on a host-by-host basis such that LUNs are presented only to selected hosts 102.

Significant in terms of the present invention is that LUN A, LUN A', LUN A", LUN A'" and LUN A"" are replicates of each other and so ideally hold the same data, and are of similar logical capacity. However, each LUN 303 represents an independent physical implementation of that data. As shown in FIG. 3, controller A and controller B configure LUN A as a RAID-5 device, controller C configures the same data store as a RAID 3/5 device, controller D as a RAID 0 device, and controller E as a RAID 1 device.

Some or all of LUNs 303 are designated as active. This designation exists at the LUN level rather than the controller level such that any given controller will be seen as the active controller for some of its LUNs, and a passive controller for others of its LUNs. It is not necessary that all members of the copy set be active, although such behavior is provided for. It is contemplated that LUNs 303 may be designated as active read/write, active read-only, and passive. A LUN 303 that is designated passive need not be presented to a host 102 until a failure event requires it to become active. A LUN 303 that is designated read-only is presented to host 1 as a read only device, and a LUN 303 that is designated active read/write is presented as a read/write device.

As shown in FIG. 3b, from the perspective of host 102, a particular volume of storage 305 comprises a plurality of LUNs 303 that are equivalent, but are differentiated by the path required to execute a particular data access transaction. Hosts 102 preferably run multi-pathing software that dynamically allows failover between storage paths as well as static load balancing of storage volumes (LUNs) between the paths of controllers 102. Multi-pathing software enables a host 102 to identify multiple connection options that lead to desired storage, and select amongst the available paths based on selected criteria. These criteria may vary widely, but typically include path availability, path performance, path load, controller load, and the like. This allows for applications to continue given any failure of fabric or the controllers. A lower cost variant of this configuration uses a fabric comprising only one switch, such that there is no E-port. Such a configuration may be appropriate for shorter distances.

Host 102 selects amongst the presented LUNs 303 preferably using the preferred LUN hint obtained from one of the controllers 105. A data access operation is executed against the selected or preferred LUN 303. In the case of writes, the controller 105 that manages the selected LUN 303 then initiates copying operations to implement the data access operation in all other LUNs 303 of the copy set.

The present invention can operate in an asynchronous or synchronous mode. To illustrate, when a host data access operation is performed, the controller 105 that handles the operation will send a message indicating completion of the operation to the host 102 that requested the operation. In the case of reads, for example, this message is provided by the return of the requested data itself. In the case of writes, this message comprises a protocol-specific (e.g., SCSI command complete message) indicating that the operation was successfully completed. In asynchronous mode, the controller 105 that manages the source LUN 303 will indicate a completion of a write operation quickly upon completion of the write to the selected source LUN 303, irrespective of whether other LUNs 303 in the copy set have completed operations to copy the data. The tasks of copying the write operation to the alternative LUNs 303 will proceed asynchronously so that for a period of time, which may be fixed or configurable, not all LUNs 303 will be required to be exact duplicates. In an active-active mode, the hosts' clustered file system processes ensure that asynchronous data is replicated before writing to the same block of data on another site. Using a SCSI write command with a "force unit access" modifier can be used to make operations synchronous on essentially an operation-by-operation basis to ensure write ordering is maintained. In some applications it may be preferable to restrict asynchronous operation when active-active functionality is enabled to reduce complexity, and reduce reliance on host processes to ensure data integrity.

In synchronous mode, an operation to any LUN 303 that would modify the data or state information associated with the data will prevent access by a host 102 to any other LUN 303 in the copy set until the requested operation is propagated and implemented in each LUN 303 of the copy set. In a synchronous mode, the controller 105 that manages the source LUN 303 will postpone an indication of a completed operation to the initiating host 102 until it receives messages from each controller 105 (e.g., SCSI command complete messages) indicating successful completion of the copy operations to each LUN 303 in the copy set. Once the command complete message is sent to the host 102, normal read/write operation continues. The host may gate I/O operations to require completion of an I/O before starting another if an application requires such behavior, but such operation is largely independent of the operation of the present invention.

Figure 4:
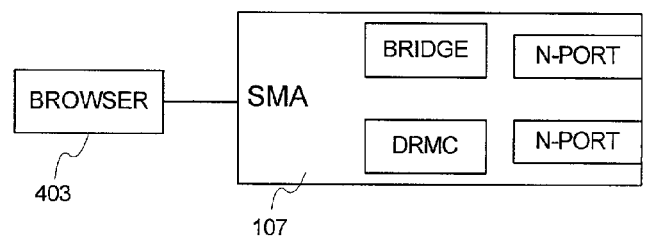
FIG. 4 illustrates an implementation of a software management appliance in accordance with the present invention.

FIG. 4 illustrates various features of a storage management appliance 107. SMA 107 is implemented in any SAN-connected computing device and may be implemented as a standalone computer, or within one of hosts 102. SMA 107 includes software processes that each present a user interface for configuration and monitoring of DRM processes. In a particular example, interfaces are presented that are accessible through a program such as an HTML browser 403 that enable an administrator to configure and monitor various features of the controllers 105. SMA 107 also implements interfaces to controllers 105 that handle basic functions of connecting to the communication network 103, issuing commands to controllers 105, and implementing security policies. All customer configuration and monitoring of DRM activities goes through SMA 107.

Figure 5:
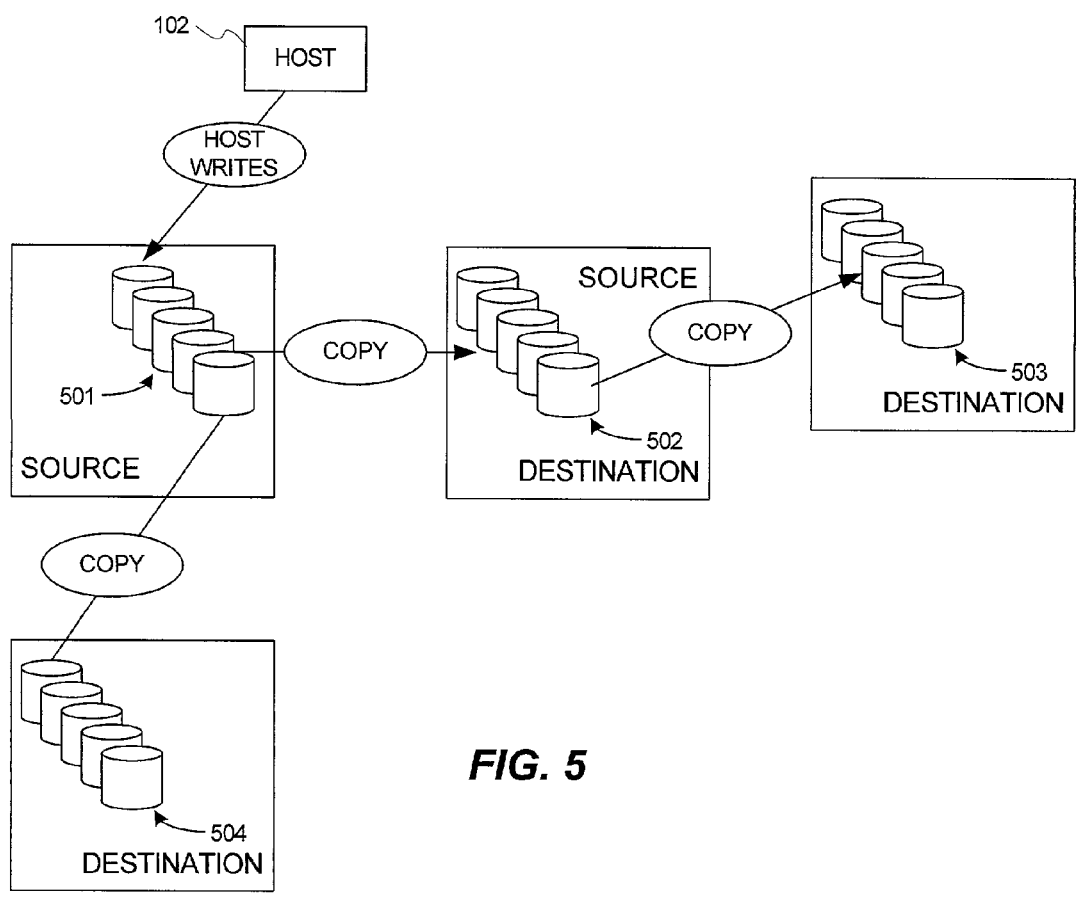
FIG. 5 illustrates a basic implementation of the present invention.

FIG. 5 shows hierarchical relationships defined in accordance with the present invention to model data replication management. In FIG. 5, the copy set comprises LUNs 501, 502, 503, and 504. While it is contemplated that all of LUNs 501–504 may be created at one time when a storage volume is first created, it is also possible that a non-replicated LUN (e.g., LUN 501), will be selected and replicated in alternative LUNs (e.g., LUNs 502–504) some time after creation of LUN 501. To better illustrate the invention, the later instance is used as a primary example such that an existing and partially populated LUN 501 is first selected and replicas are created subsequently. Moreover, a copy set may be changed at any time by removing members or adding members such that not all of the alternative LUNs 502–504 need be created at one time.

Prior to performing DRM operations, a storage cell 101 is implemented at each site, and a LUN 501 is allocated within a storage cell 101 that is handling operational data with (i.e., presented to) one or more hosts 102. LUN 501 may be replicated immediately after creation, or may be replicated at any time in its existence. Using SMA 107, LUN 501 is selected, and the user/customer directs the controller 105 that manages LUN 501 to replicate LUN 501 (referred to as a source LUN) at one or more locations. That controller 105 is aware of the universe of other controllers 105 that are available to support this replication process, and presents the options to the user/customer through SMA 107. It should be understood that a source virtual disk 501 may be allocated at any site implementing the DRM features of the present invention. Virtual disk 501 may comprise a plurality of physical storage resources that span multiple physical drives within the storage cell 101, and may implement any desired capacity and data protection type.

When a copy set is created (such as copy set A or copy set B shown in FIG. 6), destination virtual disks 502, 503 and 504 are allocated within the corresponding storage cells 101 at a designated alternative or destination site. Destination virtual disks 502, 503 and 504 have the same logical storage capacity as the source virtual disk, but may provide a different data protection configuration. Controllers 105 of the destination storage cell handle the allocation of destination virtual disk 502 autonomously. This allocation involves creating data structures that map logical addresses to physical storage capacity, and in a particular implementation involve processed described in greater detail as described in co-pending U.S. patent application Ser. No. 10/040,194 entitled "SYSTEM AND METHOD FOR ATOMIZING STORAGE" filed on Oct. 22, 2001 and which is assigned to the assignee of the present invention and incorporated herein by reference.

The actual allocation and copying of data may take up to several minutes to several hours in the case of storage of many gigabytes or terabytes. These processes can be streamlined by allocating and copying only logical storage blocks that are used in source virtual disk 501. For example, a virtual disk 501 may implement 1 terabyte of storage, but a sparsely populated example may use only a few gigabytes of capacity to store actual data. In accordance with the present invention, destination virtual disk 502 will reserve resources needed to implement the entire 1 terabyte, but will only allocate and copy the locations that are actually used to store data and may allocate the other locations. This greatly reduces the time required to create replicates. For example, when a copy set is created before any data is stored in the source LUN 501, each of the LUNs 502–504 can be fully created almost instantaneously.

A "copy set" is a set of member virtual disks where each member virtual disk is a replica of the others, and may comprise any number of replica virtual disks. While it may be easier to describe and understand the present invention by designating one virtual disk as a source or original virtual disk and the others as destinations or replicas, it is important to understand that once the copy set is created each member virtual disk is essentially a peer of all others. To create a copy set, the user designates a virtual disk as the source, and an alternate site storage cell (not a virtual disk) for the destination. The destination virtual disk does not exist prior to the copy set creation operation. Instead, it is created specifically to be a member of the copy set. Because each destination or alternative virtual disk is created on demand, it is created specifically and automatically to be compatible with the copy set. Hence, there are little or no manual procedures that must be performed to create new members for a copy set. This allows the copy set to increase (or decrease) its membership readily.

As noted before, a LUN is identified to a host 102 by a WWLID. One feature of a particular embodiment of the present invention is that each LUN in a copy set is presented to hosts 102 using the same WWLID. In this manner, the LUN appears to the host 102 as a single LUN that can be accessed by multiple paths. Preferably, each controller 105 that manages one of the LUNs in a copy set can be queried by a host 102 to determine a particular LUN or controller 105 (identified by the UUID) that is preferred (but not mandatory) for use by that host for access to the LUN. This feature supports large fan out in that any number of LUNs in a copy set can be presented as a single LUN with replication between the LUNs handled automatically by controllers 105 without involving hosts 102.

As suggested in FIG. 5, a designated source such as LUN 501 may create multiple replicas to multiple destinations such as destination 502 and destination 504. However, because each LUN 501–504 is capable of being both a source and a destination, it is contemplated that a LUN such as LUN 502 may transform from a destination to a source, and further propagate the data replication processes to another destination such as LUN 503. In such operation a device that acts as a destination then a source for the same data operation is referred to as a "repeater", and functions to store and forward data operations. Such operation may be complex to implement, however, as the connections between locations become attenuated resulting in longer latency transactions, and more difficulty in processes such as ensuring write ordering and reservation management. It is important to understand that once created, LUNs 501–504 are essentially peers, each being able to act as a source or destination for a particular operational data transaction. Hence, irrespective of which LUN 501–504 is selected to act as a source for a particular data transaction, all other LUNs 501–504 will eventually receive the transaction.

More specifically, to create a copy set, the user/customer designates a virtual disk (e.g., LUN 501) on the primary site storage cell as the source, and an alternate site storage cell 101 (not a virtual disk) for the destination. Initially, when a controller 105 at the destination site is requested to create a destination virtual disk, it determines whether its storage cell has sufficient resources (e.g., storage capacity) to service the request, reserves the necessary resources if available, and responds back to the controller 105 at the source site that the destination virtual disk is created. An existing virtual disk cannot be used for the destination. This process is very quick as the destination virtual disk is not actually allocated, and the data is not actually copied from source to destination at this time. Once the source virtual disk 501 receives this confirmation, it can continue normal operations while the actual allocation of virtual disk 502, 503 and/or 504 and copying of data can occur as background processes. Hence, the actual time that source virtual disk 501 is quiesced during the data replication initialization is a few milliseconds. It is also possible that accesses to source virtual disk 501 can be cached or buffered during the initialization process so that no downtime is observed from the hosts 102. A controller may support tens, hundreds, or thousands of copy sets, limited only by the practical constraint of the computing resources (e.g., memory and processing power) needed to manage the number of copy sets.

To implement a copy transaction between a source and destination, a path to the alternate site is found and a connection is established. This connection need not be a persistent connection, although for data that frequently changes, a persistent connection may be efficient. Preferably, a heartbeat is initiated over the connection. Heartbeats are in both directions, meaning the source site generates a heartbeat on each connection, and the alternate site(s) generates a heartbeat on each connection. Heartbeat time-out intervals are adaptive based on distance (computed round trip delay).

Figure 6:
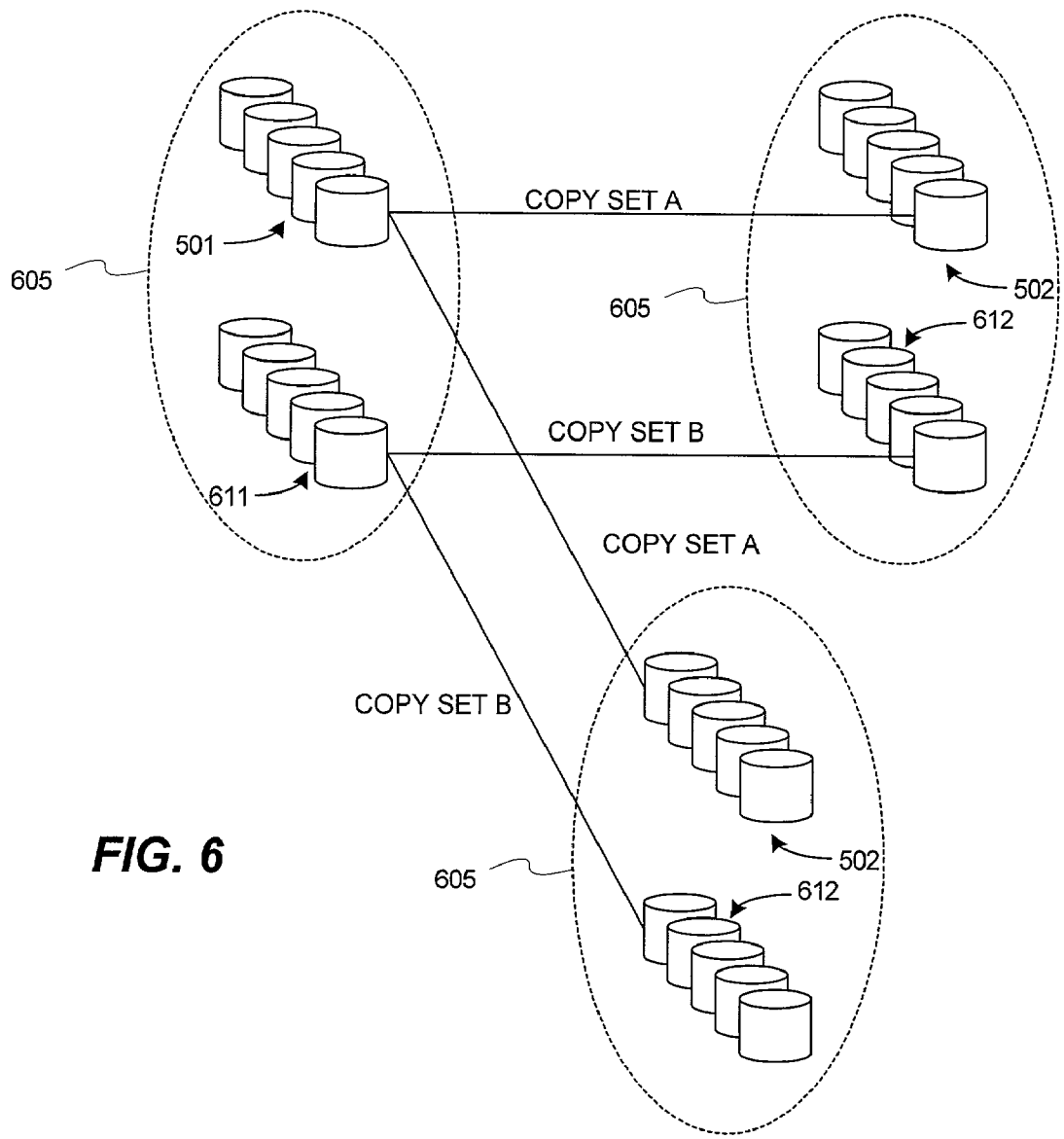
FIG. 6 shows data flow relationships in a data replication management operation in accordance with the present invention.

In the preferred implementation, objects do not span sites or storage controllers. Instead, objects exist at each site and are associated with each other as suggested in FIG. 6. For instance, the controller views a "DRM Group" 605 as a source group associated with a destination group (represented by a dashed-line oval in FIG. 6). The controller does not have a copy set object per se, rather group members (virtual disks/LUNs 501, 502 and 611, 612) that are associated. The copy set is represented by this association. In FIG. 6, virtual disks 501 are associated with virtual disks 502 to form a copy set A and virtual disks 611 are associated with virtual disks 612 to form another copy set B.

DRM groups 605 comprise a set of related virtual disks or LUNs that belong to copy sets all of which have the same source and destination. Multiple groups 605 can exist for a given source and destination combination. While in one sense a group 605 spans sites, in practice a separate logical object that represents a group is implemented in each site (i.e., each controller 105 managing a group). Hence, in another sense each group 605 comprises a set of source halves of copy sets (i.e., the source LUNs 501 and 611), or destination halves of copy sets (i.e., destination LUNs 502 and 612). A group 605 is considered a "local group" by the controller 105 that implements the group logical object, and is considered a "remote group" when implemented by another controller 105. In other words, whether a group 605 is local or remote is determined from the perspective of a particular controller 105. A local group 605 is associated with a remote group 605 when the LUNs contained in each group are in the same copy set. In a multidirectional implementation, each local group 605 will be associated with a plurality of remote groups 605.

In essence, a group contains a collection of LUNS for which a combined I/O stream must be replicated in the LUNs of each remote group to provide certain properties with regard to its interruption (e.g. a copy set holding a database and a copy set holding a journal related to the database). DRM groups 605 are used for maintaining crash consistency and preserving WRITE ordering. Crash consistency refers operation in the event that a host 102 or link to a host 102 crashes during a data transaction. In such event, it is important that the data transaction be committed to all members of the group or fail in all members of the group. In a database/journal implementation, for example, it is important to prevent a situation in which the database is modified, but the journal does not reflect the modification, or vice versa. The consistency property applies when the group has more than one member. In general, more than one virtual disk should be added to a group only if the application requires it. In most cases, a group should comprise only one member for optimal performance, in which cases the crash consistency behaviors are less important.

A group maintains write ordering among the members for asynchronous operation and logging/merging. Asynchronous operation refers to an operation mode in which a modification to one member of a copy set can be propagated to other members of the copy set after a time delay. During this time delay, the various replicas are inexact. When asynchronous operation is allowed, it is important that all replicas eventually implement the modification. Since multiple modification operations may be pending but uncommitted against a particular replica, it is necessary that the original order in which the modifications were presented be preserved when the pending modifications are applied to each replica. Even where asynchronous operation is not explicitly allowed, a destination LUN may become unavailable for a variety of reasons, in which case a copy set is implicitly operating in an asynchronous mode.

To ensure write order preservation, a record is maintained in a non-volatile storage device such as a cache for each group 605 that records the history of write commands and data from a host. The record is sized to store all write transactions until the transaction is committed to each member of a copy set. When required, the record can be written to a log on media-based storage and then later be replayed to merge the pending writes, in order, to each remote group 605. The ordering algorithm uses a "group sequence number" and the remote groups 605 ensure that the data is written in order sequence. Group members enter and exit logging at the same time, to assure order across the volumes.

In an active-active mode, any virtual disk in a copy set may initiate a write/copy operation, and so the group sequence numbering mechanisms allow each site to maintain its own group sequence. Each site then processes the group sequences from each other site in the DRM group to ensure write ordering. An important use for the group sequence mechanism is for ensuring proper write ordering during retransmissions that occur as a result of dropped frames, link failures, or site (controller failures). In retransmission events, a controller receiving the retransmission processes only missing operations from the retransmission and discards any retransmitted operations that it has already received and/or processed. Hence, the source controller for the transmission does not need to know which operations are missing for each controller, but can instead replay a log of write/copy operations in order as defined by the sequence number.

Virtual disks/LUNs in a group should have the same alternate site(s). A group 605 is limited to 32 virtual disks in a particular implementation. A virtual disk/LUN can belong to at most one group. Virtual disks/LUNS in the same DRM group 605 may belong to different disk groups. When a group object is created on the one controller 101, the controller automatically initiates creation of a symmetric group object on the alternate site controllers 101. A group is created during copy set creation, if the user chooses not to use an existing group.

At a site, all members of a group are preferably on the same controller in a dual pair to enforce cache coherency (i.e., not split between dual controllers). The preferred storage controller 101 should be the same on all members. When members are added to a group, they are automatically moved to reside on the same controller, and thereafter will failover together. If the preferred storage controller is changed on one member, it will change the setting for all members. These constraints create a configuration in which all members in a group share the same connection/path between source and destination sites. Different groups may share the same connection/path to the same alternate site or a different one. If more than one member in a group needs to copy, then they are copied one at a time with a queue depth selected to keep the pipe full for optimal performance.

Figure 7:
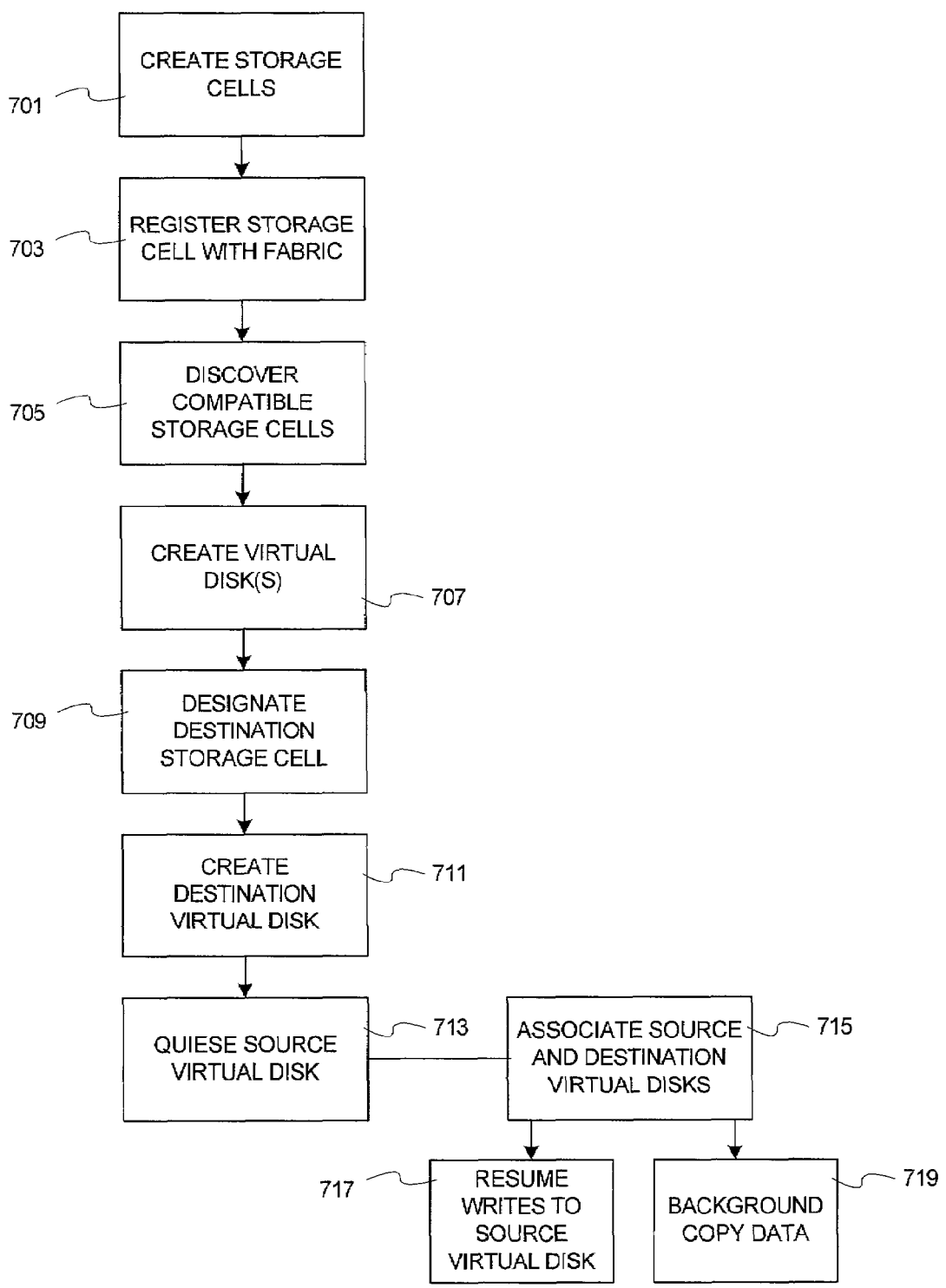
FIG. 7 illustrates logical relationships between data structures of the present invention.

FIG. 7 illustrates in flow-diagram form actions involved in operating the data replication management system in accordance with the present invention. At 701, a storage cell is created at each site to be used for storage and/or participation in the DRM system in accordance with the present invention. The storage cell creation involves the creation of logical records by controllers 105 that enable the manipulation and presentation of logical units using the physical storage capacity provided in a particular storage cell. Creation also includes actions for logging into a fabric using, for example, conventional fibre channel protocols. For purposes of simplification, the act of creation also involves allocating one or more virtual disks in the storage cells that function as primary virtual disks handling operational data transactions with various hosts.

Creation may also include registration step 703 in which the storage cell provides certain information to the fabric name server such as a UUID value. The logical construction or context of a storage cell 101 comprises the logical and data structures that are used to represent, manage and configure the raw physical storage capacity into devices that can be accessed by hosts 102 in a desired manner. To do this, controllers 105 implement and manage various logical objects that implement data structures and behavior to represent various components of each storage cell 101, preferably without involvement of hosts 102. All objects in the system are identified with a universally unique identification(UUID). The UUIDs are stored persistently in metadata structures within the physical storage which enables all or part of a storage cell, and all the LUNs implemented Therein, to be mapped and presented by any storage controller 105. In a data replication application, this benefit of virtualized storage architecture provides the ability to present the LUNs and the context in which they exist in event of a controller failure at one of the replica sites.

Information about each registered storage cell 101 in a SAN is accessed using conventional FC protocols to provide various information about the storage cells 101 to other fabric-connected devices. Each controller is identified by a unique identification number such as a 64-bit worldwide name, which is registered with the name server of fabric 301. A storage cell unique identification is provided as a 128-bit UUID in which the first 64-bits are taken from the controller world-wide name. The storage cell UUID can be used to distinguish the storage cell from other types of devices (e.g., hosts), and to indicate manufacturer, product type, version numbers, and the like that enable other devices to communicate with each other efficiently.

The registration process 703 does not, however, convey any implementation specific information in the fabric such as capacity of a storage cell, operating state, or the like. This information can be obtained by link services running between controllers 105, if desired. Preferably a link service is defined for exchanging cell implementation-specific information in step 705 such as firmware versions, operating state, DRM groups, and other DRM related data that enables distributed management of DRM events and actions.

Step 707 indicates creation of one or more virtual disks used to store operational data from one or more hosts. These virtual disks will become source virtual disks when included in a copy set, but the designation as a source has little meaning at that time. Virtual disks may be created at substantially the same time as a copy set is defined and so will be virgin or blank In the case of a virgin source disk the replica will be complete upon creation of a destination disk as both the source and destination disk are pre-zeroed for unused blocks. Alternatively, operation 707 may be performed any time before a copy set is defined. When virtual disks are written to before the copy set is defined, the written blocks must be copied from the source to destination before the copy set is complete.

A data replication process is initiated when a source virtual disk created in 707 is selected and the user indicates (e.g., via the interface shown in FIG. 4) a desire to create a data replica at one or more selected other storage cells 101. It is contemplated that the system could automatically select a storage cell to host the replica rather than enabling user selection. In 705, a source controller will query fabric 301 to discover compatible storage cells (i.e., storage cells that implement DRM services compatible with the present invention). The identity of storage cells that can support DRM operations in accordance with the present invention is then presented to the user to enable identification and selection of storage cells 101 that are available to serve as destinations in any particular instance.

Once input is obtained through the Bridge to designate one or more virtual disks in a storage cell as source virtual disks, and to designate one or more storage cells 101 as destinations in step 709, the link service conveys a message from the controller 105 in the source storage cell to the controller 105 in the destination storage cell indicating any dependent and independent attributes necessary to create the destination LUN. For example, the size of the source virtual disk must be provided, and independent attributes such as the protection type desired (e.g., none, mirrored, parity or the like) may be provided to the designated destination storage controller 105. The link service also communicates information such as the UUID of the source LUN and other parameters useful for conducting DRM transactions.

In 711, the controller 105 at the designated destination storage cell 101 creates a destination virtual disk by determining if sufficient resources exist in the storage 302 to implement the desired virtual disk in both quantity and data protection type. In the event insufficient resources exist, a failure message is returned to the controller at the source site, and communicated in an appropriate manner to the user so that alternative action can be considered. When sufficient resources are available, those resources are reserved or committed by the destination controller 105 to ensure that the resources can be eventually used to implement the destination virtual disk, and various logical objects used to represent the destination virtual disk are instantiated. An acknowledge message is returned to the requesting controller 105 including information such as a UUID of the destination virtual disk that will enable subsequent communication.

Metadata needed to map and present a storage cell 101, including the UUIDs of the various objects in that storage cell, is stored persistently in media-based storage. Because of this, in the event of a destination controller failure, another controller 105, typically a redundant or partner controller 105 in the same storage cell 101 as the failed controller 105, can reconstruct the storage cell 101. Both a controller and its partner are typically operational at the same time. Some LUNs are presented on one controller and some on the other. When a controller fails, the other controller presents the LUNs that were being presented on the failed controller. This is referred to as "failover." Other controllers 105 involved in a copy set can continue to locate the now migrated LUN presentations, and continue data replication operations without loss of data or requiring manual processes. The ability to implement this level of failure recovery substantially or wholly automatically is unprecedented.

In the event of a connection failure between a source controller 105 and a destination controller 105, the source controller 105 can readily identify each available alternate controller 105 and continue operation without loss of data or requiring manual intervention. A connection failure or link failure is distinct from a controller failure in that the controllers 105 remain operational, but unable to maintain a data communication link with one or more other controllers 105. In response to a connection failure, the source controller has several options, depending on the nature of the failure. When the source controller 105 is unable to link to fabric 103, suggesting a failure in a port of switch 301, the controller 105 can attempt to use an alternate link to fabric 103, or a redundant fabric 103 if available. When the link between fabric 103 and a destination controller 105 has failed, the source controller 105 attempts to establish a new link with a redundant port of the destination controller 105. In both of these cases, there will be no need to migrate the presentations, and data replication operations will proceed with substantially no interruption, and in most cases without any need to notify the host 102 of the aberrant condition. In contrast, prior systems had only one port on each controller available for DRM operations and so a link failure would require migrating the presentation of either source or destination LUN.

In an active-active system where two or more replicas may receive host operations that require modifying data, issues arise with respect to maintaining data integrity during normal read/write operations, during control operations involving persistent exclusive access, and during failure conditions. These issues involve "collisions" in which a host or hosts sends conflicting access requests to the LUN substantially simultaneously. To simply prevention and resolution of some of these conflicts in an active-active environment, one controller is designated as a "group master", and the LUN replica managed by that controller is designated a "master LUN".

With respect to normal operations, because the present invention presents a data replication group as a single LUN, substantially conventional host clustered file systems are relied upon to ensure that data collisions caused by hosts writing data to different replicas at the same time do not occur. When the system in accordance with the present invention detects such a data collision, the system will notify the hosts, perform a reboot, and may require a full copy operation to synchronize all replicas.

With respect to operations in which a host asserts persistent exclusive access, for example a SCSI persistent reservation, the reservation must be propagated to all controllers 105. To simplify this operation, an embodiment of the present invention routes persistent reservation command through the group master controller irrespective of which controller received the request. When a persistent reservation is received, the controller that receives the request first determines which controller is the group master. A non-master controller seeks permission from the group master to perform the persistent reservation, whereas permission is implicitly granted when the controller receiving the persistent reservation request is the group master.

Before granting permission, the group master will quiesce other controllers in the DRM group to prevent persistent reservation commands being sent to several controllers 105 at the same time, then grant permission to the requesting non-master controller. Upon receiving permission, the controller receiving the request will issue a persistent reservation command to all other controllers in the DRM group. The persistent reservation command comprises a message including the LUN ID, a command descriptor block corresponding to the SCSI reservation being implemented, and the world-wide name of the controller port that originally received the persistent reservation request.

The other controllers will acknowledge when the reservation is effected, and the controller that initially received the persistent reservation request will notify the group master that the persistent reservation is complete. The notification operation is implicit when the group master is the controller that initially received the persistent reservation request. Once the persistent reservation has been propagated in this manner to all controllers, the group master will grant permission, explicitly to non-master controllers and implicitly to itself. The group master can then unquiesce all controllers as the reservation is in place, and only the controller receiving the reservation request will be able to perform data access operation with the LUN.

The above-described implementation uses the group master as a gateway to obtain permission while the controller that initially received the request actually implements the persistent reservation. Alternatively, the controller receiving the persistent reservation request can forward the request to the group master after which the group master will implement the persistent reservation against other controllers. In either case, the present invention provides for a centralized authority, the group master, to be involved in executing the persistent reservation. This ensures that persistent reservations can be executed in order, and manages the risk associated with two controllers sending persistent reservations to each other at the same time.

The group master maintains a persistent reservation database that is synchronized to all controllers in the DRM group. The persistent reservation database indicates the scope of the reservation, the controller that originally received the reservation request, and any desire status information. In a particular implementation, the persistent reservation database is synchronized by sending data in 512 byte chunks, although it is contemplated that transfer by larger chunks of data will decrease the latency involved in synchronizing the persistent reservation database and will be desirable in particular applications. Because the persistent reservation database is synchronized across all controllers, should a controller holding a persistent reservation fail, another controller can take over the persistent reservation process and maintain and release the reservation appropriately.

Figure 8:
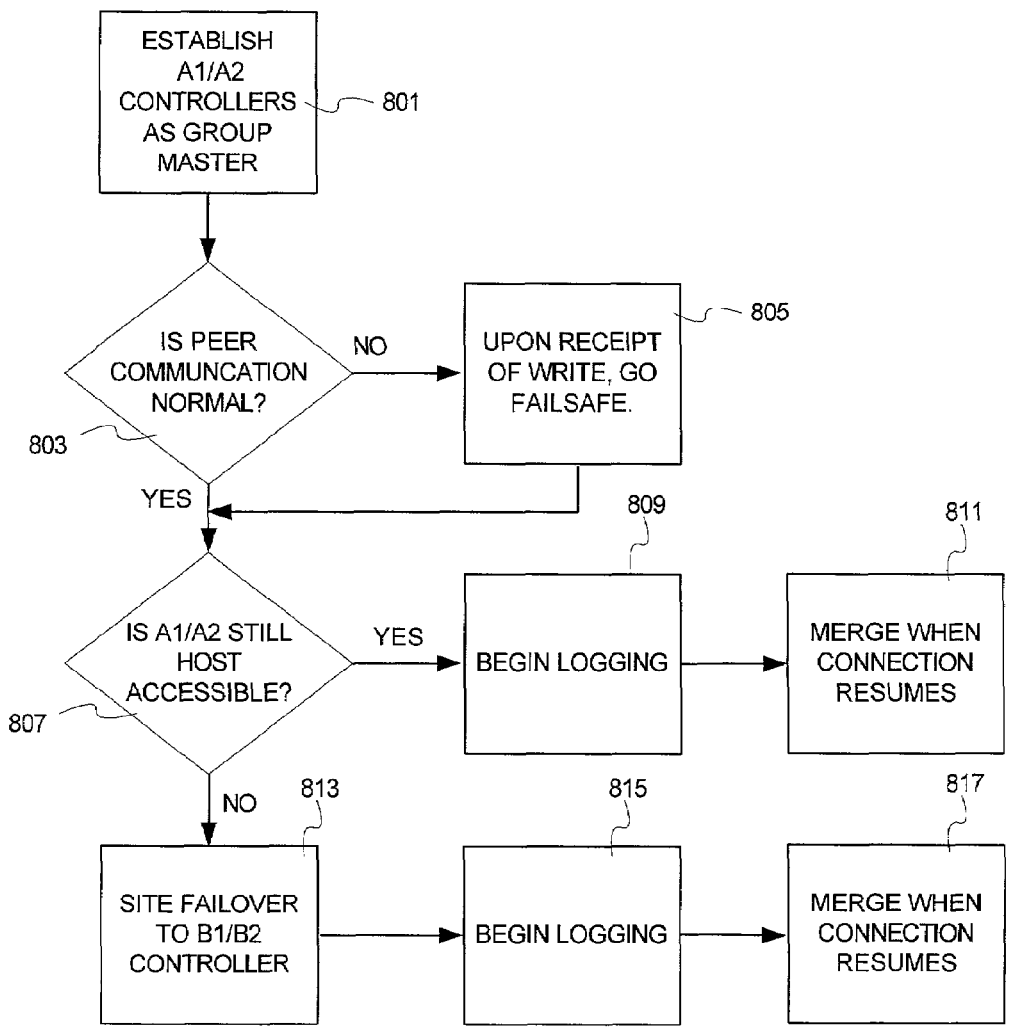
FIG. 8 shows a flow diagram illustrating operations involved in responding to link and controller failures in an active-active environment.

In the event of a controller or link failure, active-active operation could result in multiple controllers processing requests to the same data because they are unaware that another controller is processing a request to the same data. Because of the connection failure, controllers cannot issue quiesce or exclusive access commands to maintain data integrity. This risk is managed by the present invention using the processes described in reference to FIG. 8. In 801, it is established that a redundant controller pair A1/A2 is the group master. Peer communication is continuously monitored in 803 using the heartbeat mechanism to identify when a peer controller is no longer accessible. In 805, when peer communication is down, if a write operation is received the controller goes into a failsafe mode automatically (i.e., without receiving a command from another controller) in which host I/O operations are prohibited. Before receiving the write command, it may be acceptable to allow read operations to the disconnected replica.

Hence, failsafe operation is not mandatory upon receipt of a read operation. To assist in automatic recovery from a site connection failure it may be necessary to failsafe lock read operations after failure to connect for some fixed period measured in seconds. In an active-active mode, the failsafe lock mechanism prevents operational members of a group from processing write operations that might affect integrity of a data stored in the group. A controller that is in failsafe mode will reject host I/O requests and thereby enable the host to take appropriate action while the data storage system recovers. A failsafe lock will persist across reboots so that a controller that is in failsafe mode will reboot into a failsafe mode. The failsafe lock mode is preferably automatically cleared when the condition that caused the lock (e.g., failure of a peer controller) is removed and in most cases a full copy will not be required where logging operations 805/815 provide a sufficient record of operations that occurred during the failsafe mode.

The controller also monitors the health of host communication in 807. Although operations 803 and 807 are presented as sequential operations in FIG. 8, they can be implemented as substantially parallel processes that are performed on an ongoing basis by each controller. When a controller identifies that it can still communicate with a host, it begins to log operations on behalf of the missing controller or controllers in 809. The operation log stores operation data, metadata, control information and the group sequence number for all received operations and can be played back during a merge operation 811 when the connection to the missing peer becomes available.

When the host is not available, the system must failover to another controller (specified as the B1/B2 controller in FIG. 8) that does have host access. A site failover involves operations that change a controller in a non-group master role into a group master role, or move the LUNs managed by the current group master controller A1/A2 to another controller and then making that controller a group master. Failover may be simplified when a connection exists between the peers as identified in operation 803 as the connection enables the original master controller to initiate the role change. Failover benefits from the feature that allows each controller to be active, so that the LUNs in the to-be-designated group master controller are already presented to the hosts. The newly designated group master will preferably begin logging operations 815 on behalf of the original group master on the assumption that the unit will become available, and merge when the connection resumes in 817. Although the original A1/A2 controller can not be active due to its inaccessibility to hosts, it can continue to receive data replication commands when the connection to the new group master is operational. Hence, in some instances it is contemplated that logging and merge operations 815 and 817 may not be required.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A system for replicating data between a plurality of storage locations comprising:
   a data communication network having an interface for receiving data access requests from one or more host systems;
   a plurality of storage locations, wherein each storage location comprises a port to the data communication network and a pool of storage;
   a logical unit (LUN) of storage implemented at each storage location, wherein each implemented LUN comprises a substantially complete replica of the data stored in each other LUN;
   wherein at least two controllers at the plurality of storage locations present their implemented LUN as an active device to the one or more host systems for receiving operational data access requests;
   wherein each of the at least two controllers implements a link service for exchanging information through the data communication network indicating that controller's capability; and
   wherein the link service exchanges information comprising firmware revisions, operating state, and DRM groups.

2. The system of claim 1 wherein the data communication network comprises a fibre channel switch.

3. The system of claim 1 wherein each LUN implemented as an active device performs operational data transactions with any of the one or more hosts and initiates remote copy operations to at least one other of the plurality of storage locations to implement the operational data transaction in the at least one other storage location.

4. The system of claim 1 further comprising mechanisms in the controller at each storage location for identifying a preferred LUN to a requesting one of the plurality of hosts, the preferred LUN indicating a specific one of the presented active devices to which the requesting host preferably will treat as a source LUN.

5. The system of claim 1 wherein the LUN implemented at each controller can be dynamically designated as either a source LUN or a destination LUN on a transaction-by-transaction basis.

6. The system of claim 1 further comprising means for designating one of the presented active devices as a source LUN for one or more operational data transactions.

7. The system of claim 1 wherein the substantially complete replica comprises an asynchronous copy.

8. The system of claim 1 wherein the substantially complete replica comprises a synchronous copy.

9. A SAN storage controller comprising:
   a data processor system configured to implement software processes;
   at least one I/O port;
   a pool of storage accessible trough the data processor system;
   processes executing in the processor to enable the at least one I/O port to couple to an external communication network;
   processes executing in the processor for communicating data access requests with at least one external host computer through the at least one I/O port; and processes executing in the processor for creating at least one logical unit (LUN) of storage from the pool of storage;

processes executing in the processor for designating the at least one LUN as a member of a copy set comprising one or more other LUNs that are accessible through external SAN storage controllers coupled to the external communication network;

processes executing in the processor for designating the at least one LUN as active or passive;

processes executing in the processor for presenting each LUN that is designated as active to the at least one external host irrespective of whether any other LUN in the copy set is designated as active; and processes executing in the processor for copying data from at least one LUN to more than one other LUN in a copy set.

10. The SAN storage controller of claim 9 further comprising processes executing in the processor for implementing a link service with at least one other external SAN storage controller.

11. The SAN storage controller of claim 9 further comprising processes executing in the processor for switching the designation of the at least one LUN between active and passive without rebooting the SAN controller.

12. The SAN storage controller of claim 9 wherein the processes for designating the at least one LUN enable the LUN to be designated as active-read only.

13. The SAN storage controller of claim 9 wherein the processes for designating the at least one LUN enable the LUN to be designated as active-read/write.

14. The SAN storage controller of claim 9 further comprising:

a preferred LUN hint stored in the SAN controller, the preferred LUN hint indicating the identity of one LUN in a copy set that is preferably treated as a source LUN for a particular host.

15. The SAN storage controller of claim 9 further comprising processes executing in the processor for:

receiving a message identifying a LUN that is to be replicated on another SAN controller;

reserving storage capacity for a LUN of substantially identical logical address space as the identified LUN; and sending a message to the other SAN controller indicating that the storage capacity reservation is complete before having allocated and copied the LUN.

16. The SAN storage controller of claim 9 wherein the at least one LUN is operable as both a source LUN and as a destination LUN for a copy set to which it belongs.

17. A copy set storing replicated data comprising:

a plurality of storage cells, each implementing a logical unit (LUN) of storage that is a member of the copy set;

means within each storage cell for presenting the implemented LUN to host computers; and means for selecting one of the presented LUNs to act as a source LUN for a particular host data access transaction, wherein the plurality of storage cells comprises at least three storage cells.

18. A method for managing data replication in a storage area network (SAN) comprising:

implementing a plurality of storage cells in the SAN;

providing a first logical unit (LUN) of storage in a first storage cell;

designating the first LUN as a source LUN;

designating at least one other storage cell as a destination storage cell;

creating alternate LUNs in each of the at least one designated destination storage cells, wherein after each alternate LUN is created, both the first and the alternate LUN can be dynamically placed in a role of a source LUN or a destination LUN, wherein the act of creating an alternate LUN comprises creating an alternate LUN having a data protection type that differs as compared to the first LUN, and implementing a link service for exchanging information through the SAN indicating a controller's capability, wherein the link service exchanges information comprising firmware revisions, operating state, and DRM groups.

19. The method of claim 18 wherein the act of creating alternate LUNs comprises:

reserving storage capacity in the designated destination storage cell;

allocating a memory map for each alternate LUN in the designated destination storage cell; and copying data from the first LUN to each alternate LUN.

20. The method of claim 19 further comprising causing the first LUN to process operational data access requests before the acts of allocating and copying are completed.

21. The method of claim 19 wherein the reserved storage capacity is selected to have substantially identical logical storage capacity as the first LUN.

* * * * *

UNITED STATES PATENT AND TRADEMARK OFFICE
CERTIFICATE OF CORRECTION

PATENT NO. : 6,996,672 B2
APPLICATION NO. : 10/106865
DATED : February 7, 2006
INVENTOR(S) : Clark Lubbers et al.

It is certified that error appears in the above-identified patent and that said Letters Patent is hereby corrected as shown below:

On the Title page, in field (73), in "Assignee", in column 1, line 1, delete "Development," and insert -- Development Company, --, therefor.

In column 20, line 60, in Claim 9, delete "trough" and insert -- through --, therefor.

Signed and Sealed this

Fourteenth Day of July, 2009

JOHN DOLL
*Acting Director of the United States Patent and Trademark Office*